(No Model.)
F. A. LOCKWOOD.
CHAIN CONVEYER.
No. 420,277. Patented Jan. 28, 1890.
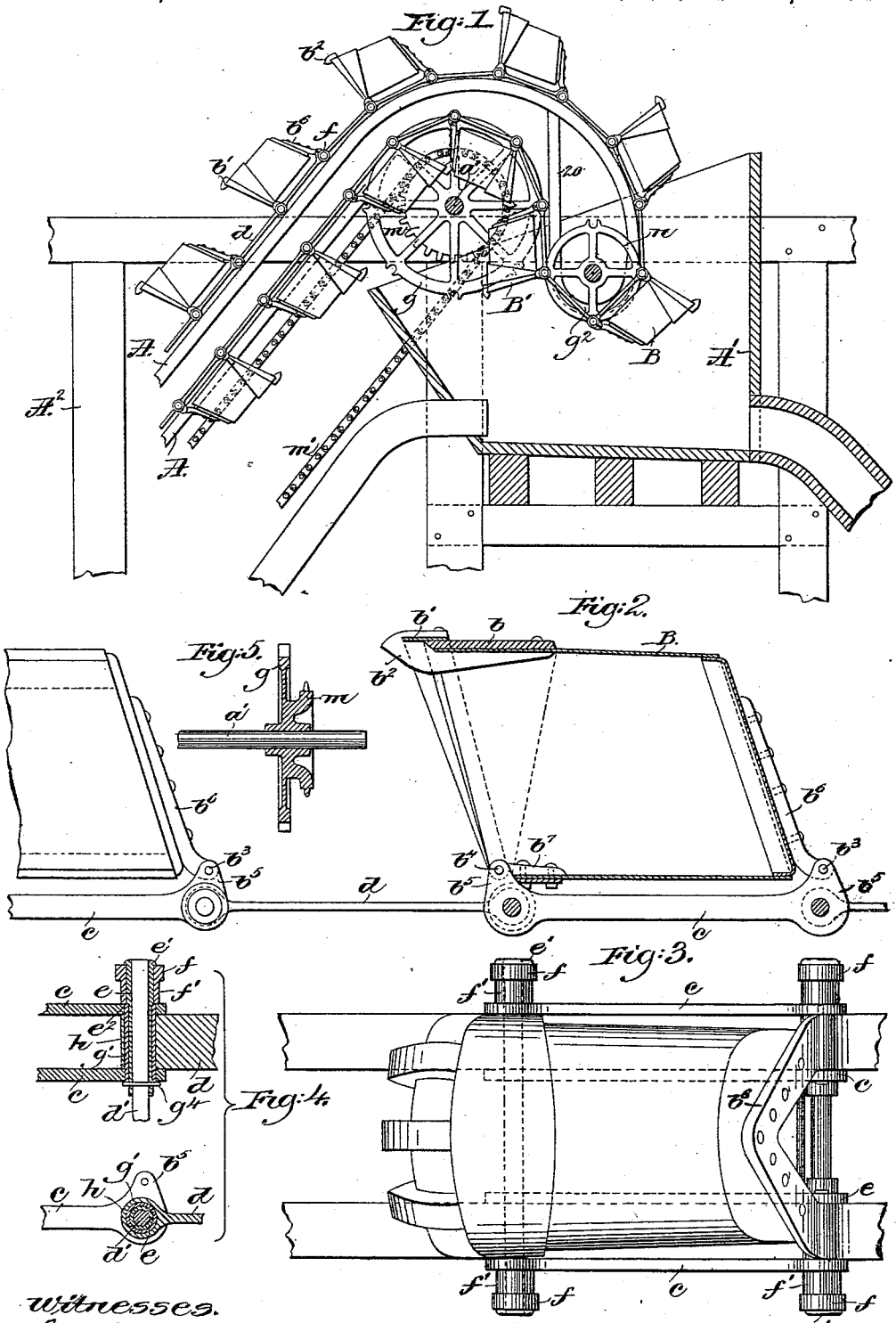
Witnesses:
Frederick L. Emery
Edgar L. Goddins
Inventor:
Frederic A. Lockwood,
by Crosby & Gregory
atty

UNITED STATES PATENT OFFICE.

FREDERIC A. LOCKWOOD, OF BOSTON, MASSACHUSETTS.

CHAIN CONVEYER.

SPECIFICATION forming part of Letters Patent No. 420,277, dated January 28, 1890.

Application filed November 15, 1889. Serial No. 330,453. (No model.)

*To all whom it may concern:*

Be it known that I, FREDERIC A. LOCKWOOD, of Boston, county of Suffolk, State of Massachusetts, have invented an Improvement in Chain Conveyers, of which the following description, in connection with the accompanying drawings, is a specification, like letters on the drawings representing like parts.

This invention has for its object to improve and simplify the construction and cost of chain conveyers, my invention being herein shown as applied to that class of apparatus represented in United States Patent No. 387,649, granted to me on the 14th day of August, 1888. In the chain conveyer referred to the empty buckets travel down the upper run of the track supporting the endless chain of buckets and the full buckets follow up the lower run of said track, and the buckets have hinged doors which are tripped at the proper places to discharge the contents of the buckets into the hopper. In my efforts to simplify this class of chain conveyer and at the same time strengthen the same for hard digging I have discovered that, by carrying the under run or track of the chain up to near the top of the usual driving sprocket-wheels and carrying the upper run or track over the said sprocket-wheels and to one side of and below the same where it is turned or looped inward toward the sprocket-wheels, so that as the chain of buckets passes over the said sprocket-wheel it passes under and in contact with the loop of the upper run and the direction of travel of the said chain of buckets is reversed and the buckets inverted, the doors for said buckets and the operative mechanism for the said doors may be dispensed with and at the same time the number of joints in the chain may be lessened, thus lessening its cost and increasing its durability. The loop of the upper run may have located in close proximity to it an idler-wheel having its periphery substantially coincident with the curve of the loop, and the said idler-wheels may assist to support the chain of buckets. In my improved chain conveyer the buckets filled with dredge or other material are inverted between the sprocket-wheels and the lower portion of the loop referred to and drop their contents into the hopper.

My invention in an elevator consists, essentially, in the combination, with an endless chain of buckets and sprocket-wheels to drive the same, of tracks comprising an upper and lower run to support the said endless chain of buckets, the upper track or run being extended over and partly around the sprocket-wheel and curved inward to form a loop to receive the endless chain on its return travel, and thereby invert the buckets, substantially as will be described.

Figure 1, in partial side elevation and section, represents a sufficient portion of a chain conveyer with my improvements added to enable my invention to be understood. Fig. 2 is an enlarged detail part of the chain and parts of two buckets, one being in section and the other in elevation. Fig. 3 is a top or plan view of one of the buckets and parts of the attached chain. Fig. 4 shows details of the connecting devices for the chain, and Fig. 5 a detail of one of the driving sprocket-wheels.

The frame-work $A^2$ of the apparatus, which may be a dredge, is and may be of suitable shape to sustain the hopper $A'$ and the working parts to be described. The frame-work has a track A, which is and may be of usual construction.

The buckets B are made preferably from sheet metal suitably formed and riveted together, one end only of the bucket being left open, whereas the bucket in the patent referred to had one end and the top side open, and the other or bottom end of the bucket was closed by a hinged door. The buckets described in the said patent, not being closed at their top sides, were found in practice to yield or give to bowlders or hard digging and the buckets were frequently twisted out of shape, so that the hinged door failed to latch or unlatch properly in operation. The bucket herein described is riveted solidly together, as explained, and having a closed upper side and bottom is made very strong, so that it will stand great strain without yielding, and should the bucket yield by excessive strain upon it, none of the other working parts of the chain conveyer are displaced or prevented from working.

To enable the bucket to better enter the dirt or material to be moved, the bucket has been provided at its front end with a strengthening-plate $b$ and with a cutting-edge $b'$, which project beyond the bucket-edge, and preferably the bucket also has added to its mouth a series of teeth, as $b^2$, which co-operate with the cutting-edge $b'$ to displace bowlders and guard and protect the said cutting-edge. The bucket is firmly attached by strong bolts or pins $b^3$ $b^4$ to ears $b^5$ of the bucket-links $c$. The pins $b^3$ enter ears of a strengthening-brace $b^6$, riveted to the bottom of the bucket, while the pins $b^4$ enter suitable ears of a strengthening-plate $b^7$, bolted or riveted to the bucket at its mouth close to the chain, as shown in Fig. 2. The bucket-links $c$ are made double or composed of four bars, two at each side, as best shown in Fig. 3. The two links $c$ of each pair of links are connected together at their opposite ends by means of a tubular bushing $e$, (shown enlarged in Fig. 4,) the said bushing having at its outer end a head, as $e'$, and at a little distance therefrom a shoulder $e^2$, which comes against one link $c$. Each bushing between the head $e'$ and the link $c$ is surrounded loosely by a wheel $f$ to run on the usual track $A$ $A'$, the hub $f'$ of each wheel being engaged by a driving sprocket-wheel $g$ at the upper end of the track. The bushings between the links $c$ of each pair of links are surrounded by an auxiliary bushing $g'$, over which is placed the hollow end or eye $h$ of the connecting-link $d$. The bushings $e$ at opposite sides of the chain have extended through them a rod, as $d'$, and the said bushings and rods are joined together by suitable pins or keys $g^4$, which tie the bushings, and consequently the links, together to constitute both sides of the chain. Each sprocket-wheel $g$, there being one such wheel at each side of the bucket, is secured to the sprocket-shaft $a'$, and each sprocket-wheel, as herein shown, (see Figs. 1 and 5,) has at the outer side a sprocket-rim, as $m$, which is engaged by a sprocket-chain $m'$, driven from some suitable source of motion not shown, it rotating the sprocket-wheel $g$ and the shaft $a'$. The bushings referred to obviate any wear on the chain and may be readily replaced when worn. By driving the sprocket-wheels as described, torsional strain due to the transmission of power is obviated. The chain referred to in practice is endless, and the under run thereof is passed over the driving sprocket-wheels $g$, and the loaded buckets carried up at the under side of the chain pass between the said driving sprocket-wheels. The upper run or tracks are carried over and beyond and down below the sprocket-wheels $g$ and are curved inward or looped, as at $g^2$, and preferably the inner arm or side 20 of the loop is carried up and riveted or otherwise secured to the upper track to obtain increased strength or stiffness to the loop. The inner arm or side 20 of the loop is brought sufficiently near the periphery of the sprocket-wheel $g$ to have the wheel $f$ bear against it.

In conjunction with the loops $g^2$ of the upper track I may employ an idler-wheel $n$, having bearings in the frame-work and suitably notched to receive the hubs of the wheels $f$, the chain surrounding the said idler-wheels at the point where the direction of travel of the chain is reversed to pass down the upper run, and as shown in Fig. 1 by the bucket B' the said buckets are inverted, so that the material is discharged directly from the mouth of the bucket into the hopper, from which the said material is removed in usual manner.

I claim—

1. In an elevator, the combination, with an endless chain of buckets and sprocket-wheels to drive the same, of tracks comprising an upper and lower run to support the said endless chain of buckets, the upper track or run being extended over and partly around the sprocket-wheel and curved inward to form a loop $g^2$ to receive the endless chain on its return travel, and thereby invert the buckets, substantially as described.

2. In an elevator having an endless chain of buckets, a track for the bottom and top runs of the chain, and driving sprocket-wheels over which the lower run of the chain is passed, combined with an idler-wheel located below the said driving sprocket-wheels and adapted to reverse the chain for its return travel, the bucket being overturned for discharge between the said driving sprocket-wheels and idler-wheels, substantially as described.

3. The endless chain, including in its construction the pairs of links $c$ $c$ and $c$ $c$, the connecting-link $d$, the bushings $e$, and the rods $d'$, combined with the driving sprocket-wheels and tracks, to operate substantially as described.

4. The endless chain, including in its construction the pairs of links $c$ $c$ and $c$ $c$, the connecting-links $d$, the bushings $e$ and $g$, and the rods $d'$, combined with the driving sprocket-wheels and tracks, to operate substantially as described.

In testimony whereof I have signed my name to this specification in the presence of two subscribing witnesses.

FREDERIC A. LOCKWOOD.

Witnesses:
JAS. H. CHURCHILL,
FREDERICK L. EMERY.